United States Patent
Melton et al.

(10) Patent No.: US 7,469,541 B1
(45) Date of Patent: Dec. 30, 2008

(54) PORTABLE POWER SYSTEM

(76) Inventors: David S. Melton, 7301 Rosewood Ct. NW, Albuquerque, NM (US) 87120; Odes Armijo-Caster, 281 Valley High St. SW, Albuquerque, NM (US) 87105

( * ) Notice: Subject to any disclaimer, the term of this patent is extended or adjusted under 35 U.S.C. 154(b) by 0 days.

(21) Appl. No.: 10/725,671

(22) Filed: Dec. 2, 2003

Related U.S. Application Data

(60) Provisional application No. 60/430,215, filed on Dec. 2, 2002.

(51) Int. Cl.
*F01K 27/00* (2006.01)
(52) U.S. Cl. .................... 60/641.1; 60/641.8
(58) Field of Classification Search .......... 60/641.1, 60/641.8, 641.15
See application file for complete search history.

(56) References Cited

U.S. PATENT DOCUMENTS

| | | | |
|---|---|---|---|
| 1,951,360 A * | 3/1934 | Holzwarth | 60/39.17 |
| 2,364,144 A | 12/1944 | Hunsaker | |
| 2,920,710 A | 1/1960 | Howard | 180/67 |
| 4,000,850 A | 1/1977 | Diggs | |
| 4,147,157 A | 4/1979 | Zakhariya | |
| 4,206,608 A | 6/1980 | Bell | 60/698 |
| 4,261,329 A | 4/1981 | Walsh et al. | 126/417 |
| 4,359,951 A * | 11/1982 | Dauvergne | 110/234 |
| 4,371,135 A * | 2/1983 | Keigler | 244/172.8 |
| 4,551,980 A | 11/1985 | Bronicki | 60/698 |
| 4,553,037 A * | 11/1985 | Veazey | 290/55 |
| 4,569,331 A | 2/1986 | Tani et al. | |
| 4,628,692 A | 12/1986 | Pierce | |
| 4,913,985 A | 4/1990 | Baer | |
| 4,982,569 A | 1/1991 | Bronicki | 60/698 |
| 5,259,363 A | 11/1993 | Peacock et al. | |
| 5,315,794 A | 5/1994 | Pearson | |
| 5,452,710 A | 9/1995 | Palmer | |
| 5,512,787 A | 4/1996 | Dederick | 290/4 |
| 5,857,322 A | 1/1999 | Cohn | |
| 5,969,501 A | 10/1999 | Glidden et al. | 320/101 |
| 6,101,750 A | 8/2000 | Blesener et al. | 40/448 |
| 6,201,181 B1 * | 3/2001 | Azzam et al. | 136/244 |
| 6,357,512 B1 | 3/2002 | Baer et al. | |
| 6,396,239 B1 * | 5/2002 | Benn et al. | 320/101 |
| 6,551,017 B1 * | 4/2003 | Strassman | 404/77 |
| 6,559,552 B1 | 5/2003 | Ha | 290/54 |
| 2002/0153178 A1 * | 10/2002 | Limonius | 180/2.2 |
| 2003/0054329 A1 * | 3/2003 | Springett | 434/373 |
| 2003/0105556 A1 | 6/2003 | Enis et al. | 700/286 |

FOREIGN PATENT DOCUMENTS

| JP | 09229470 | 8/1997 |
|---|---|---|
| JP | 10275507 | 9/1998 |

* cited by examiner

*Primary Examiner*—Hoang M Nguyen
(74) *Attorney, Agent, or Firm*—Deborah A. Peacock; Vidal A. Oaxaca; Peacock Myers, P.C.

(57) ABSTRACT

A remote and portable, hybrid power system comprising one or more of the following components: a solar system, batteries, a back-up generator, a wind energy system, and a communications system. The components are disposed on a platform that is portable and transportable to the remote location by a truck or other transportation vehicle.

23 Claims, 2 Drawing Sheets

PORTABLE POWER SYSTEM

This application claims the benefit of the filing of U.S. Provisional Patent Application Ser. No. 60/430,215, entitled "Remote Power System", filed on Dec. 2, 2002, and the specification thereof is incorporated herein by reference.

BACKGROUND OF THE INVENTION

1. Field of the Invention (Technical Field)

The present invention relates to a portable, hybrid power assembly comprising one or more of the following components: a solar energy power system, batteries, a back-up generator, and a wind energy system. These components are constructed on a platform that is transportable to a location, including remote locations, by a truck or other transportation vehicle that travels by land, water, or air.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Methods and devices for providing remote power or using hybrid, renewable energy sources are known. For example, U.S. Patent Application Publication 2003/0105556 discloses a method and device for using wind to supply uninterrupted power to locations not served by a power grid. However, the invention does not provide for portability and uses only wind energy that may be stored as compressed air.

U.S. Pat. No. 6,559,552 discloses an electric generating installation using rain, wind, wave, and solar energy. The invention relies on at least one of the sources being active to provide for continuous energy generation. This patent does not describe portability.

U.S. Pat. No. 6,101,750 discloses a "portable message sign". The sign is portable, but harnesses only solar energy for powering only a sign.

U.S. Pat. No. 4,261,329 discloses a portable housing module that contains a "solar energy system", but the system is integral to the housing module to which it provides energy.

U.S. Pat. Nos. 4,982,569 and 4,551,980 disclose hybrid systems for generating power. Portability is not disclosed and only photovoltaic and wind energy are harnessed to charge a battery and to supply current to an electrical load.

U.S. Pat. No. 4,206,608 discloses a system for the storage and generation of electricity using solar, wind, and wave energy. Portability is not disclosed.

U.S. Pat. No. 2,920,710 discloses a solar steam generator to power a vehicle.

Japanese Patent JP411069893A discloses a power generation system using wind energy, solar energy, and an engine. Japanese Patent JP02000116007A discloses a power generation system using wind power and a solar battery. Neither patent discloses portability.

U.S. Pat. No. 5,969,501 discloses a portable solar power system. Portability is an objective of the invention, but only solar energy is harnessed. The solar power system is not severable from the disclosed trailer.

The prior art does not address the need to provide portable, continuous, reliable, and renewable energy power—particularly to remote sites.

BRIEF SUMMARY OF THE INVENTION

The present invention comprises a portable, hybrid power assembly comprising a renewable energy power system disposed on a transportable platform which is in turn removably disposed on a vehicle for transport to locations including remote locations. The renewable energy power system comprises a solar energy power system preferably comprising at least one solar panel.

The solar power system preferably comprises a solar panel array comprising photovoltaic cells. The solar panel array is preferably greater than 640 watts and optimally between 1000 and 2000 watts. The solar system tracks and moves in the direction of the sun so that maximum energy is produced.

The assembly may further comprise a back-up generator and a fuel storage container, a wind energy system, and batteries that are preferably enclosed in a cool-cell battery box to store energy generated by the solar and wind energy systems. The assembly may further comprise a communications system and may further comprise a satellite communications dish. The batteries are connected to the structure to be supplied with electricity and the assembly further comprises an inverter to convert the energy from direct current to alternating current. Optionally, the assembly may comprise any combination of one or more of a solar energy power system, a wind energy system, batteries, back-up generator, and communications system.

The portable assembly is transportable to locations where energy is needed, including remote locations. The assembly may include an electric output connector to connect the renewable energy power system to a structure or vehicle to supply electric energy to the structure or vehicle.

The invention also comprises a method for providing portable, renewable energy comprising the steps of providing a renewable energy power system, disposing the renewable energy power system on a transportable platform, and removably disposing the transportable platform on a transporting vehicle. The renewable energy power system and the platform are transportable to a location where energy is required, including remote locations. The method of the present invention includes the steps of connecting the renewable energy power system to a structure or vehicle requiring energy and providing a solar energy power system, a wind energy power system, batteries, a back-up generator, a communications system, or any combination of those components.

A primary object of the present invention is to provide for portable renewable energy.

A primary advantage of the present invention is that it is provides continuous, uninterrupted energy to remote sites immediately upon delivery.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
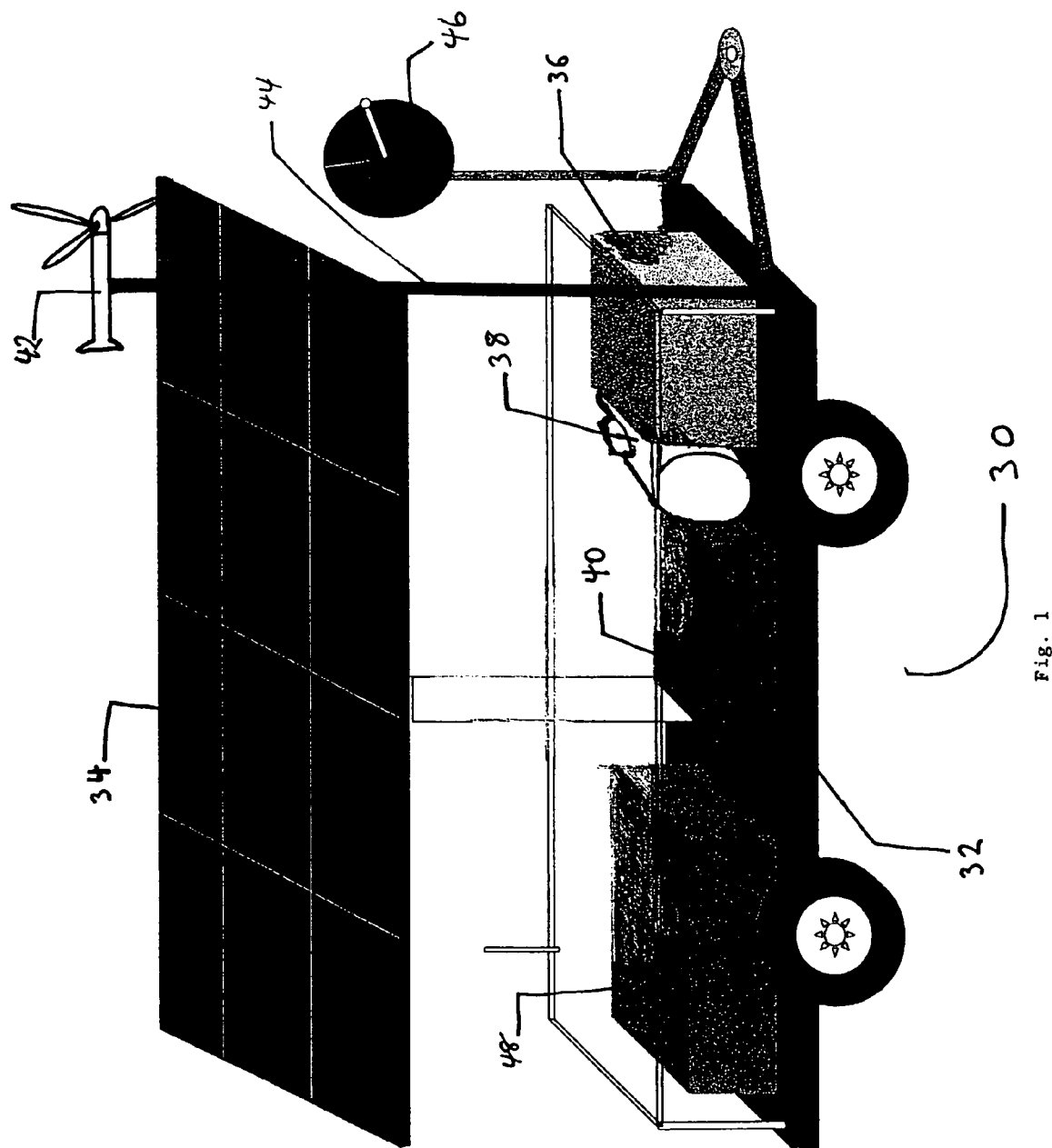
FIG. 1 shows the preferred remote power assembly of the present invention with solar array, generator, fuel tank, batteries and cool cell, wind turbine, and communications satellite dish.

The present invention relates to a portable hybrid power assembly. The power assembly comprises one or more of the following components: a solar power system, batteries, a back-up generator, and a wind energy system. These components are disposed on a platform that is transportable to any location, including remote locations by a truck or other transportation vehicle, including vehicles that travel by land, water, or air.

The solar system preferably comprises at least one solar panel and preferably a solar panel array, comprising photovoltaic cells. It is preferable that the solar array is greater than 640 watts, and most preferably between 1000-2000 watts. The solar system preferably tracks the sun and thereby moves in the direction of the sun so that the maximum energy is produced. The preferred tracking system is a motorized two-axis tracking system that allows the array the follow the sun throughout the day, producing more power than a fixed array or a seasonally adjusted array.

The wind energy system comprises conventional wind energy machines, known in the art, such as a propeller windmill, "eggbeater" style windmill, wind turbine and the like. The wind energy system is preferably mounted on a tower (e.g. 20-40 feet) on the platform for providing energy. Wind energy is particularly useful to provide supplemental power at night or on windy days.

The energy produced from the solar system and/or wind energy system is transferred to batteries that can store the energy. The preferred batteries are industrial grade, deep-cycle, maintenance free, gel-cell batteries that do not need to be checked and do not need additional water added over their life.

The batteries are preferably enclosed in a cool-cell battery box (preferably manufactured by Zomeworks of Albuquerque, N. Mex.). The cool cell keeps the batteries at a set range of temperatures. The cool cell removes heat away from the batteries, through water convection, thereby extending the battery life. The cool cell uses a reservoir of water within an insulated enclosure to absorb heat from battery charging and from the environment. At night, the warmed water convects up to the radiator lid on the enclosure, cools and returns to the reservoir below. Each night the reservoir is recharged with cool water and the enclosure is ready for another day of heat. In the winter, during freezing weather, this same reservoir of water releases heat (e.g. 144 BTUs per lb.) as it freezes—enough heat to guard the enclosure from subfreezing temperatures for several days in most climates.

A satellite dish may also be provided on the platform for communications (e.g. television, Internet, etc.). Preferably, a two-way satellite Internet system and satellite telephone is included, allowing for inexpensive communications.

The platform further comprises an electric output cord that is connected from the battery system to the home, business or other building structure to provide the electricity to the structure. The energy is converted from direct current to alternating current for output to the structure. A power condition unit (inverter) is included, preferably up to 5 kw.

The platform preferably further comprises a back-up generator, such as a propane-powered or other hydrocarbon-powered generator, along with a fuel tank for storing the fuel. The generator operates at its peak for shorter periods of time, maximizing its efficiency and extending its service life. Of course, if the generator must provide additional run time to compensate for reduced wind speed or reduced solar insolation, the generator can handle it with virtually no additional stress. Consequently, if the loads are reduced, little or no generator usage would result.

The platform, itself, is preferably made of steel or other structural material. It is important for it to have substantial weight so that the wind does not blow the assembly over after it has been positioned. The platform can be mounted on a trailer and then slid into position at the location. If it needs to be moved after being delivered, a truck winch or tractor can slide the platform around to another location. Alternatively, the platform can remain on the trailer, for movement at a later time.

Figure 2:
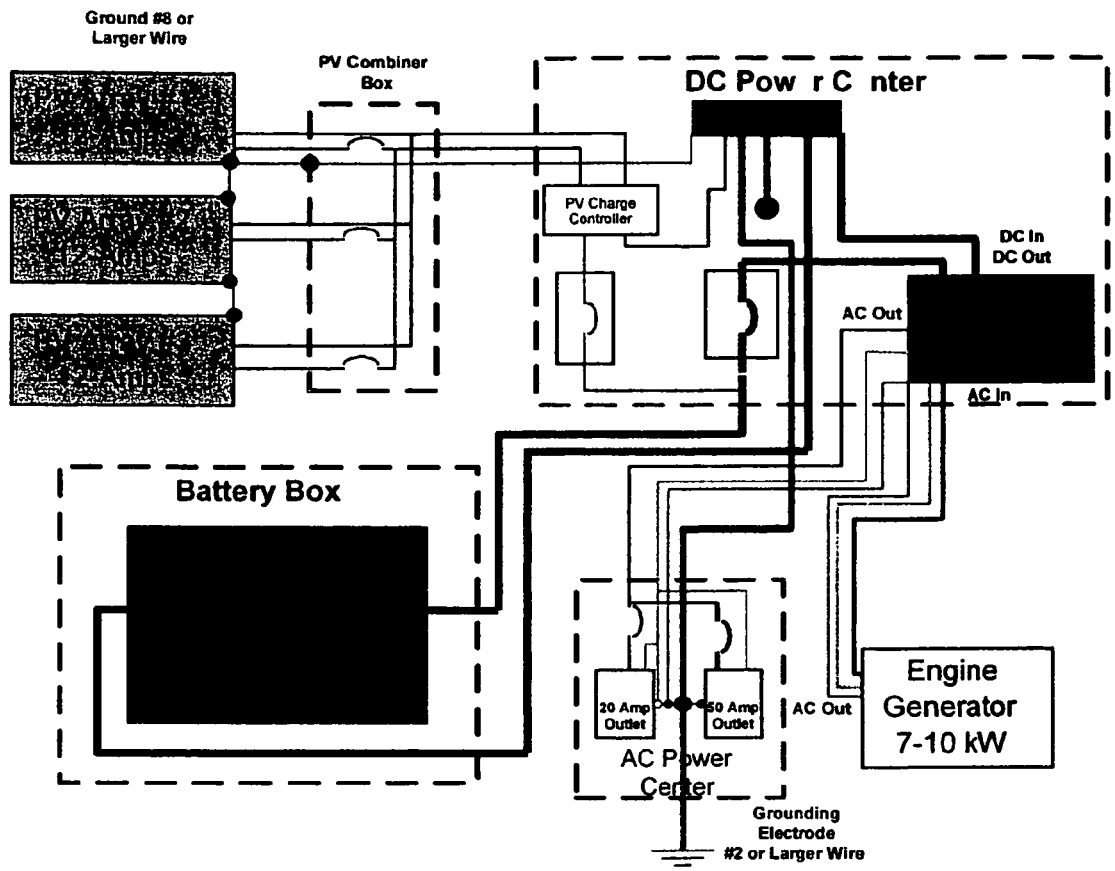
FIG. 2 shows a power schematic of the present invention.

Turning now to the figures, which illustrate the preferred embodiment of the invention, FIG. 1 shows assembly 30 of the present invention, mounted on trailer 32. Solar array 34, generator 36, fuel tank 38, and batteries 40 are depicted. Optional wind turbine 42 with wind tower 44 and satellite communications system 46 are shown. Also shown is housing 48 for an inverter, charge controller, and other electronic components. FIG. 2 shows a preferred embodiment of a power schematic of the present invention.

The assembly and system(s) of the present invention are maintenance free and fully automated. It is a compact size, but has a heavy weight for stability. It is transportable to the remote or other location. It has high quality at a low cost. Once delivered, the assembly and system are completely operational. The only on-site construction is the erection of the optional wind tower and/or the telecommunications equipment. Both of these are preferably attached to the platform or erected near the platform and the electrical connections are made directly to the adjacent inverter.

EXAMPLE

A remote assembly was constructed in accordance with the present invention. There was included a 1200 watt photovoltaic solar array (manufactured by Matrix Photovoltaics) mounted on a motorized tracking system (manufactured by Array Technologies) that increased the power producing by 38% than a fixed array. A "Cool-Cell" battery box (manufactured by Zomeworks of Albuquerque, N. Mex.) housed eight gel-cell, maintenance free batteries. A 12,000 watt propane-powered generator was mounted on the platform, along with a 120-gallon tank, which is enough for 30 days of two hours/day operation. A 1000 watt Bergey XL.1 wind turbine on a 30-foot tower was also mounted on the platform. The platform was made of steel frame. The system had a continuous power output rating of 2.5 kw/hour. The dimensions were: length (14.5 feet), width (5.5 feet), height (12.5 feet), and weight (4000 lbs.). The assembly included satellite communications (both telephone and Internet). A larger power conditioning unit (inverter), 5 kw, was included. The output was 240 volts ac.

The assembly provided the peak power requirements of 45 kwh/day load by operating in the following manner, with the following components:

1. 1000 watt wind turbine: provided 6,800 watt-hours/day from a class 4 wind field mounted on a 30-foot tower.

2. 1200 watt array on dual-axis tracker provided 1200 watts×8 hours/day=9,600 watt-hours/day plus 38% additional power by tracking=13,248 watt-hours/day dc reduced 25% for ac conversion=9,936 watt-hours/day.
3. 12,000 watt propane generator running 2.35 hours/day=28,264 watt-hours/day.

| | |
|---|---|
| 6,800 watt-hours/day | wind turbine. |
| 9,936 watt-hours/day | PV array. |

28,264 watt-hours/day generator @ 2.35 hours/day. Propane burn rate @ full load=1.97 gal/hour=4.6 gallons/day. 120-gallon tank provided approximately a 30-day supply TOTAL: 45,000 watt-hours/day Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A portable power assembly comprising:
    a platform, said platform being transportable and having a substantial weight for stability so that a wind does not blow the assembly over;
    a renewable energy power system disposed on said platform, said energy power system providing continuous and uninterrupted energy after delivery to a remote location or to a location comprising a home, business or other building structure;
    the renewable energy power system comprising a solar energy power system having at least one photovoltaic solar panel and a motorized tracking system for automatically moving said at least one photovoltaic solar panel in response to movement of the sun, after delivery of the system to the location;
    an alternative power system disposed on said platform, said alternative power system comprising a back-up generator and a fuel storage container connected to said back-up generator providing continuous and uninterrupted back-up power after delivery of the system to the location;
    an energy storage system comprising batteries disposed on said platform providing continuous and uninterrupted back-up power after delivery of the system to the location;
    said platform removably disposed on a transporting vehicle for transportation and delivery of said platform and said renewable energy power system thereon to the location; and
    an electrical output cord providing power to the location after delivery of the system.

2. The assembly of claim 1 wherein said photovoltaic solar panel array produces greater than 640 watts.

3. The assembly of claim 1 wherein said photovoltaic solar panel array produces between 1000 and 2000 watts.

4. The assembly of claim 1 further comprising a wind energy system.

5. The assembly of claim 1 wherein a temperature of said batteries is controlled by a temperature controlling device.

6. The assembly of claim 1 further comprising an inverter to convert energy from direct current to alternating current.

7. The assembly of claim 1 further comprising a communications system.

8. The assembly of claim 7 wherein said communications system comprises a satellite dish.

9. The assembly of claim 1 further comprising a wind energy system and a communications system.

10. The assembly of claim 1 further comprising an electric output connector to connect the renewable energy power system to a structure or vehicle to supply electric energy to the structure or vehicle.

11. A method for providing portable energy comprising:
    providing a renewable energy power system, the renewable energy power system comprising a solar energy power system having at least one photovoltaic solar panel and a motorized tracking system for moving the at least one photovoltaic solar panel and tracking the sun;
    providing an alternative energy power system comprising a back-up generator and a fuel storage container connected to the back-up generator;
    providing an energy power storage system comprising batteries;
    connecting the renewable energy system and the alternative back-up generator system with the storage batteries;
    disposing the energy power systems and the batteries on a transportable platform having a substantial weight for stability so that a wind does not blow the assembly over;
    removably disposing the transportable platform on a transporting vehicle for transporting the platform, the energy power systems and batteries disposed thereon;
    transporting the transportable platform with the energy power systems and batteries disposed thereon to a remote location or to a location comprising a home, business or other building structure;
    connecting an electrical output cord from the system to a fixed, external home, business or other building structure for providing power to the external building structure;
    filling the fluid storage container with fuel;
    generating the energy from the solar energy power system;
    automatically tracking the sun with the photovoltaic solar panel as the sun moves and increasing the energy generation;
    generating the energy from the back-up generator using the fuel from the fuel storage container as an alternative to the solar energy power system;
    storing at least a portion of the energy generated in the batteries; and
    providing the generated or stored energy power to the external building structure through the electric cord in a continuous uninterrupted output, after delivery of the system to the location.

12. The method of claim 11 wherein the renewable energy power system further comprises a wind energy system.

13. The method of claim 11 wherein the renewable energy power system further comprises a communications system.

14. The assembly of claim 4 wherein said wind energy system is erectable.

15. The assembly of claim 7 wherein said communications system is erectable.

16. The method of claim 12 wherein the wind energy system is erectable.

17. The method of claim 13 wherein the communications system is erectable.

18. The method of claim 11 generating sufficient energy to completely power the external building structure on a daily basis.

19. The method of claim 11 further comprising controlling a temperature of the batteries.

20. The assembly of claim 1 further comprising a platform slidably positionable at the location.

21. The assembly of claim 1 further comprising a motorized two-axis tracking system.

22. The method of claim 11 further comprising positioning the portable power system after delivery to the desired location by sliding the system platform.

23. The method of claim 11 comprising tracking the sun with a motorized two-axis tracking system, after delivery of the system to the location.

* * * * *